Patented May 5, 1925.

1,536,706

UNITED STATES PATENT OFFICE.

OTTO ERNST AND HANS WAHL, OF HOCHST-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

PROCESS FOR CHLORINATING BENZENE.

No Drawing. Application filed November 21, 1923. Serial No. 676,176.

*To all whom it may concern:*

Be it known that we, OTTO ERNST and HANS WAHL, citizens of Germany, residing at Hochst-on-the-Main, Germany, have invented certain new and useful Improvements in the Process for Chlorinating Benzene, of which the following is a specification.

The present invention relates to a process of chlorinating benzene which consists generally in treating benzene vapors with a mixture of hydrochloric acid vapors and oxygen in the presence of a contact substance or catalyst which promotes the interaction of hydrochloric acid and oxygen with the liberation of chlorine. Monochlorbenzene is the principal product.

The process is carried out by flowing a mixture of benzene vapors, hydrochloric acid vapors and oxygen or air at a temperature of at least 300° C. over a suitable catalyzer. The resulting vapors are condensed, the aqueous portion separated from the oily portion and the latter, after washing with alkali if necessary, is subjected to fractional distillation, whereby the chlorinated products are separated from unchlorinated hydrocarbon which may be returned to the chlorinating operation.

A process is already known according to which benzene hydrocarbons are chlorinated by subjecting the same in liquid phase to the action of nascent chlorine but this process which is carried out at a comparatively low temperature does not lead to the conclusion that the Deacon process which involves the use of a comparatively high temperature can be used for the chlorination of benzene. Nor does the known method of using hydrochloric acid and oxygen for perchlorinating unsaturated hydrocarbons lead to the conclusion that benzene can be chlorinated by a similar treatment, because the unsaturated hydrocarbons have peculiar properties, and besides the treatment of unsaturated hydrocarbons gives perchlorinated products, whereas applicants' process gives products of a low degree of chlorination, particularly the monochlorbenzene.

Example: A tube of acid-resistant material is filled with small pieces of pumice stone soaked with copper chloride and heated to 400° C. Through this tube is passed a mixture of oxygen and the vapors of commercial hydrochloric acid, about 30%, and benzene in about the proportion of 15 parts by volume of the benzene vapors, 50 parts by volume of the commercial hydrochloric acid vapors, of which about 9 parts by volume are HCl and 7½ volumes of oxygen. The vapors issuing from the tube are cooled and the condensate which consists of aqueous hydrochloric acid, benzene and chlorinated benzene, is separated into an aqueous portion and an oily portion and the latter, after washing with alkali, is subjected to fractional distillation to separate the unaltered benzene, the monochlorbenzene and the small quantity of higher chlorinated products present.

Instead of oxygen a corresponding amount of air may be used.

We claim:

Process of chlorinating benzene which comprises passing a mixture containing benzene vapors, hydrochloric acid vapors and oxygen, at a temperature of at least 300° C. over a contact substance which promotes the interaction of hydrochloric acid and oxygen with the liberation of chlorine.

In testimony whereof, we affix our signatures.

OTTO ERNST.
HANS WAHL.

Witnesses:
GABRIELE FLESCH,
JANE GUISH.